United States Patent Office 3,341,545
Patented Sept. 12, 1967

3,341,545
PYRIDINE ISOCYANATES
Seymour Hyden, Spring Valley, and Godfrey Wilbert, Carmel, N.Y., assignors to Nepera Chemical Co., Inc.
No Drawing. Filed May 20, 1966, Ser. No. 551,548
1 Claim. (Cl. 260—296)

This is a continuation-in-part application of our copending application Ser. No. 407,574, filed Oct. 29, 1964, now abandoned.

This invention relates to a composition of matter and more particularly to new and novel pyridine 3-isocyanates and pyridine 2,6-diisocyanates of the formula:

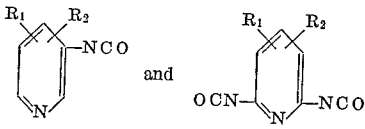

and wherein $R_1$ and $R_2$ may be hydrogen, lower alkyl such as methyl, ethyl, isopropyl and the like; halogen such as chloro or bromo; nitro, aryl such as phenyl; substituted aryl such as p-chlorophenyl, 3,4-dichlorophenyl, p-methoxyphenyl, or a heterocyclic radical such as furyl, pyridyl and the like; lower alkenyl such as vinyl, aralkyl such as tolyl, halogen, haloalkyl, alkoyl and aroyl such as benzoyl. The compounds of this invention are important as pharmaceutical and agricultural chemical intermediates, starting materials for adhesive and resins and cross linking agents in plastics preparation. For example, they may be used according to the teachings of Saunders and Frisch, Polyurethanes: Chemistry and Technology; High Polymers, vol. XVI, Part I, published by Interscience Ltd. (1962). They are also useful for chain terminating and cross linking polymers with pendant hydroxyl or amino groups and improving dyeability by virtue of the pyridine ring basicity. For example, a polyoxyalkylene elastomer may be reacted with a pyridine isocyanate to form a urethane link and the resulting product is susceptible to dyes containing acid groups. They are also useful for making isocyanate derivatives.

According to the present invention, these compounds are prepared by heating substituted pyridyl azides or diazides of the formula:

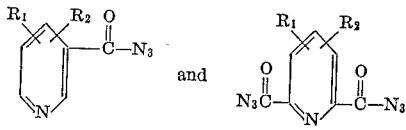

and in an inert medium such as benzene or toluene at a temperature of from about 70° to 100° C. until the resulting decomposition reaction is completed. The reaction solvent is then removed by distillation and the reaction product is recovered by distillation or sublimation.

The following examples are included in order further to illustrate the invention:

EXAMPLE 1

*Pyridine-3-isocyanate*

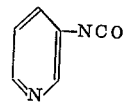

Nicotinyl azide is suspended in 150 ml. of dry benzene and heated slowly to 70° C. Decomposition commences and is accompanied by nitrogen evolution. The temperature is maintained between 70° and 80° C. until decomposition is completed and the benzene is removed by distillation. Pyridine-3-isocyanate is obtained on distillation at 183°–185° C. as a water-white liquid that crystallizes to a bright yellow solid on standing, M.P. 91°–93° C. The infrared spectrum of the liquid features an (—NCO) absorption band at 2260 cm.$^{-1}$.

Percent N calc., 23.33. Found, 23.56.

EXAMPLE 2

*Pyridine-2,6-diisocyanate*

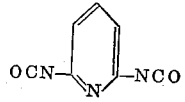

Pyridine-2,6-diisocyanate is synthesized by the same method as described in Example 1 employing dipicolinyl diazide as starting material. The compound is a yellow solid and exhibits —NCO absorption at 2250 cm.$^{-1}$ in the infrared spectrum. It sublimes at 110°/3 mm.

Percent N calc., 26.08. Found, 25.72.

It is understood that the foregoing detailed description is given merely by way of illustration and that many variations may be made therein without departing from the spirit of our invention.

Having described our invention, what we desire to secure by Letters Patent is:

Pyridine-3-isocyanate.

References Cited

UNITED STATES PATENTS 2,848,457    8/1958    Mathes et al. _____ 260—294.8

FOREIGN PATENTS 2,291    3/1960    Japan.

OTHER REFERENCES

Chem. Abstracts, vol. 54, par. 20317 (1960).
Lowy: Introd. to Org. Chem., Wiley, 1945.

WALTER A. MODANCE, *Primary Examiner.*

JOHN D. RANDOLPH, *Examiner.*

A. ROTMAN, *Assistant Examiner.*